Figure 17:
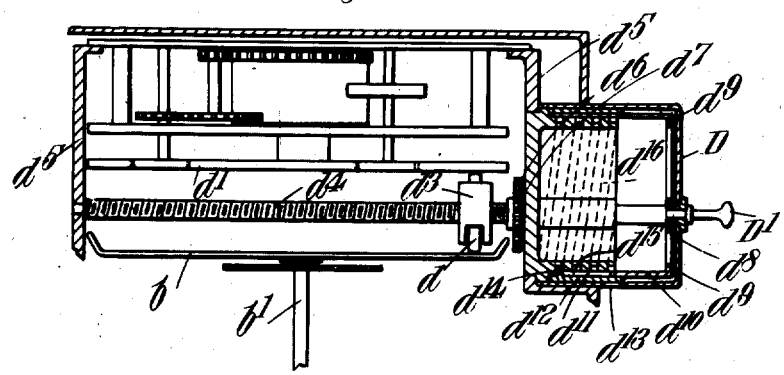

No. 896,975. PATENTED AUG. 25, 1908.
A. T. DAWSON & G. T. BUCKHAM.
RANGE KEEPER.
APPLICATION FILED FEB. 1, 1907.
8 SHEETS—SHEET 1.
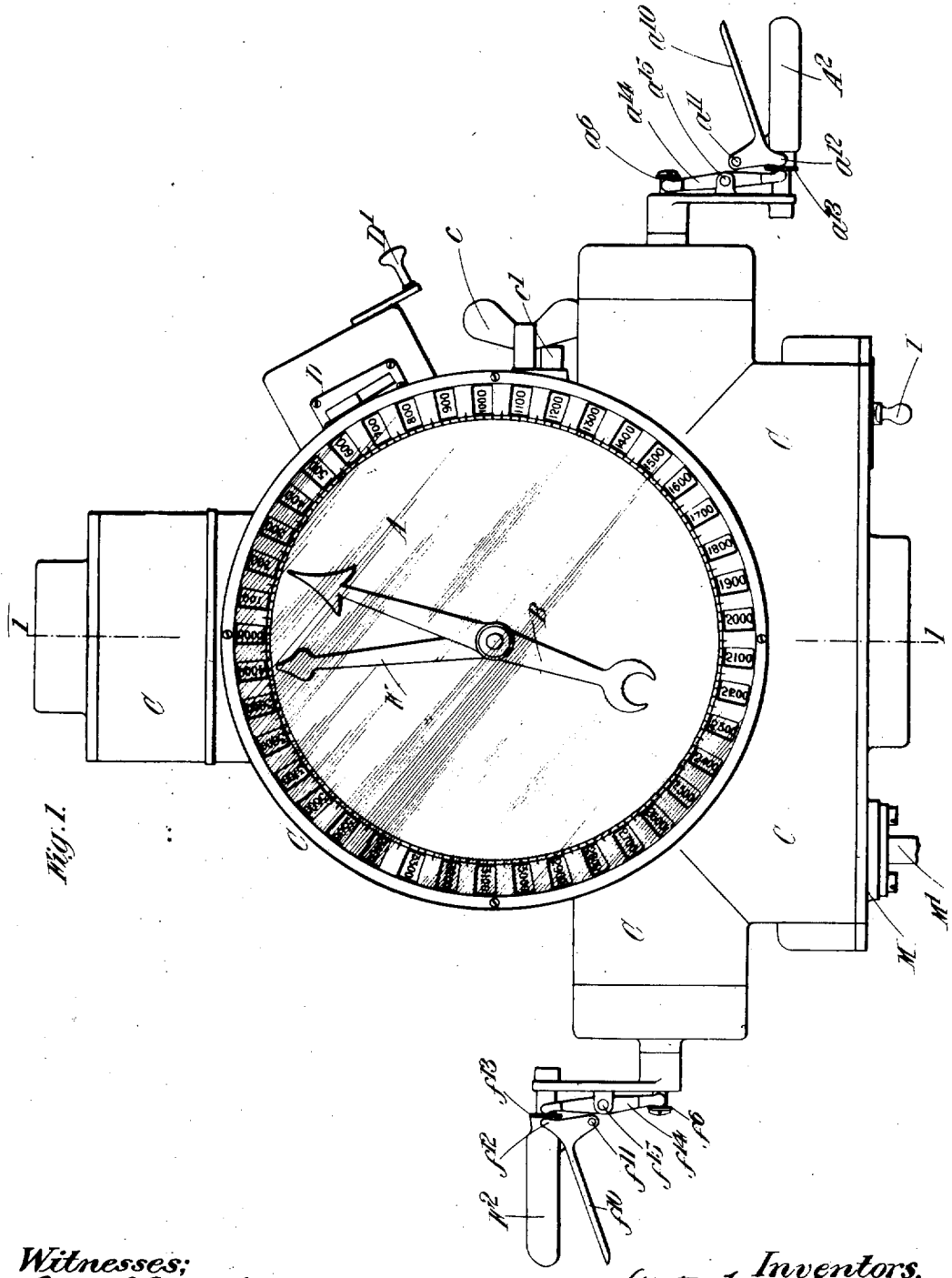

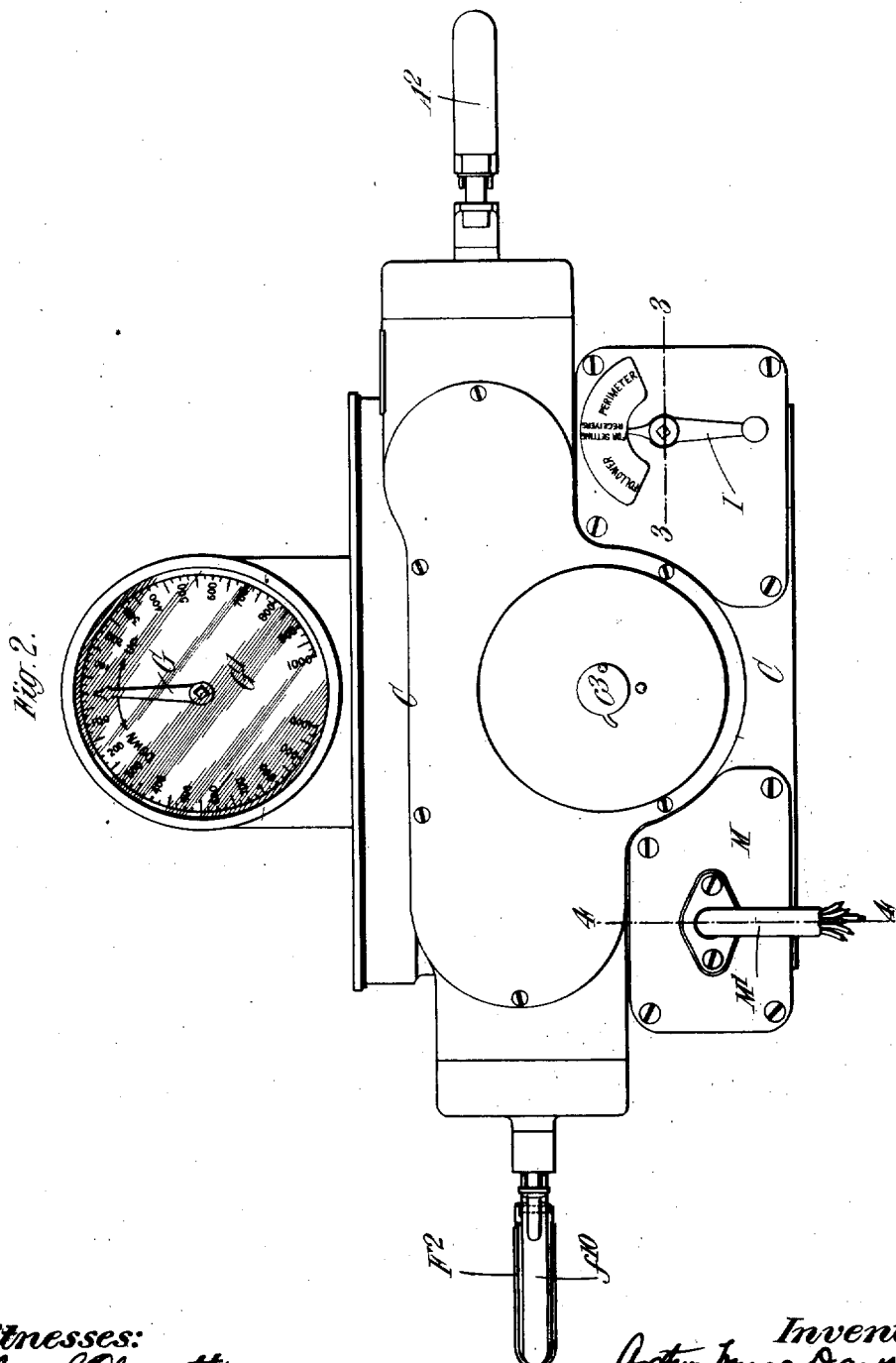

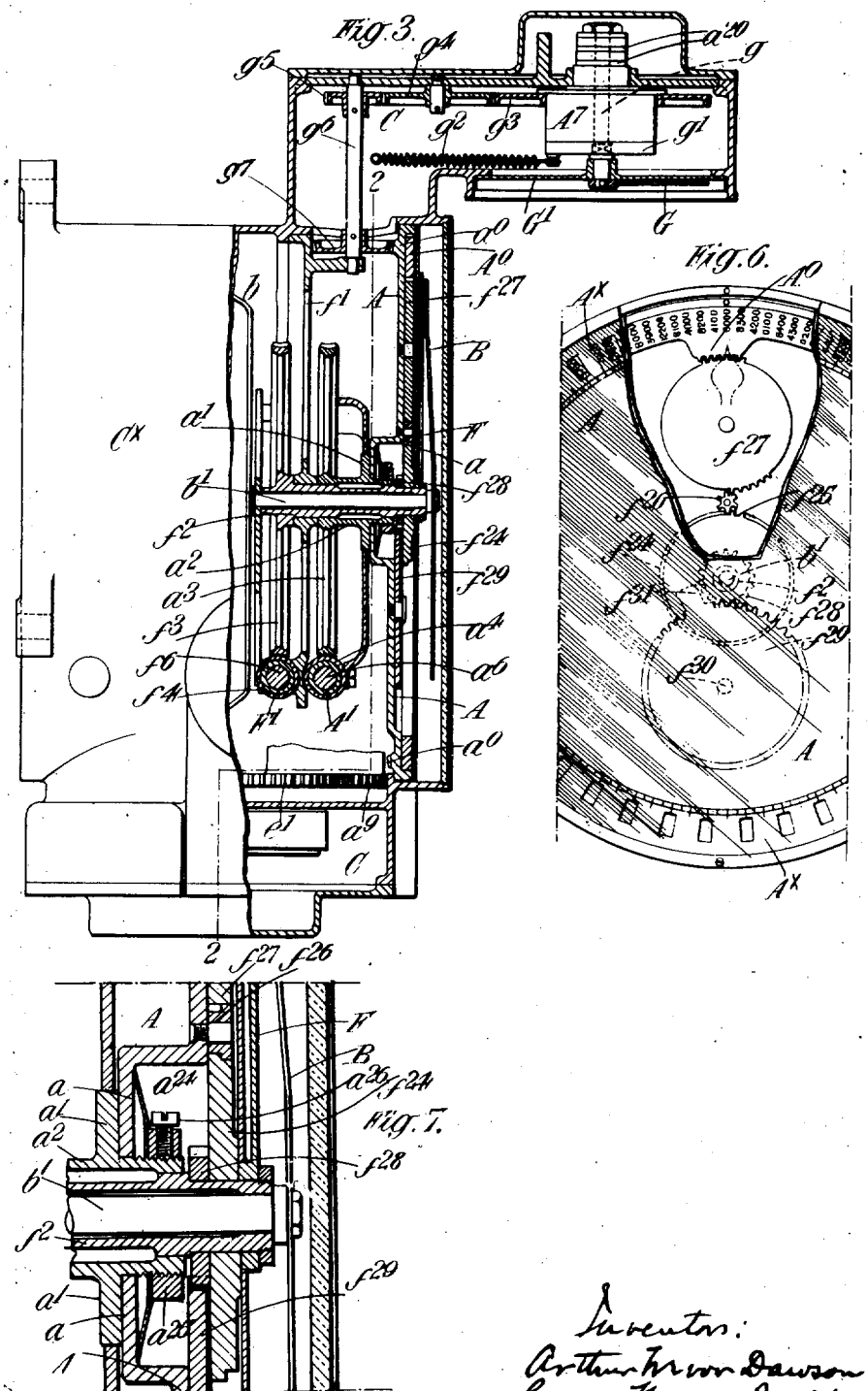

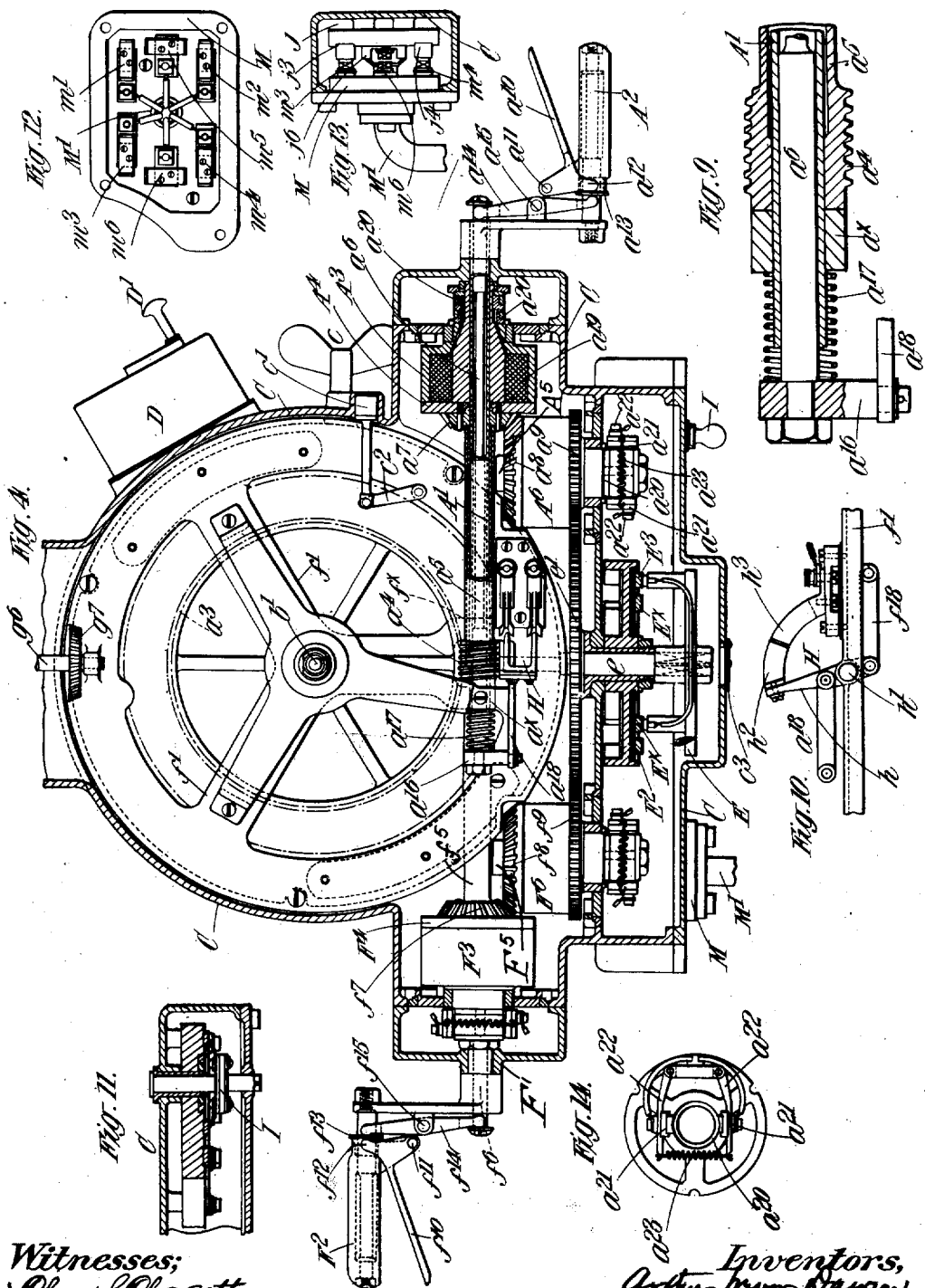

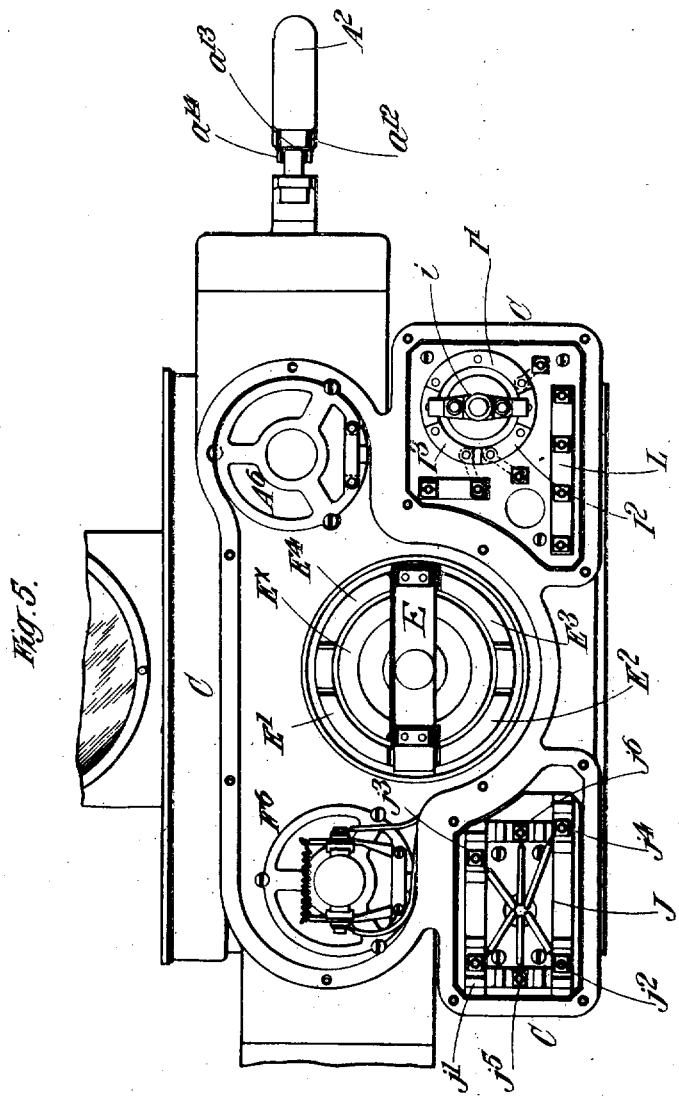

No. 896,975. PATENTED AUG. 25, 1908.
A. T. DAWSON & G. T. BUCKHAM.
RANGE KEEPER.
APPLICATION FILED FEB. 1, 1907
8 SHEETS—SHEET 6.
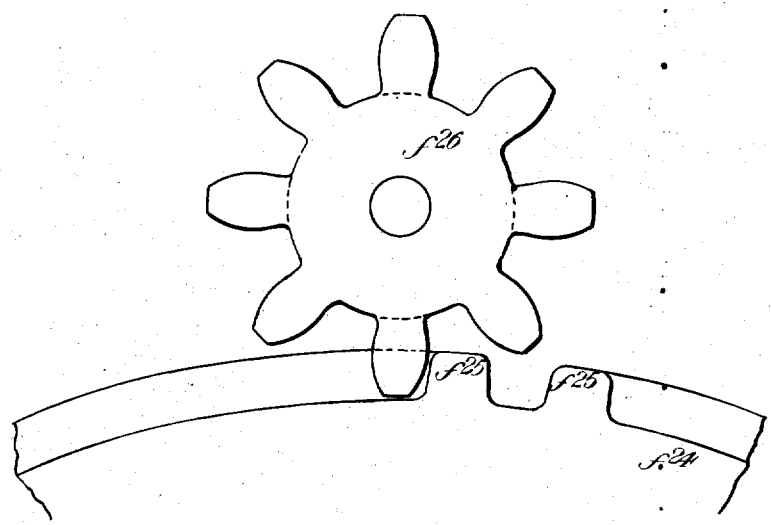
Fig. 8.
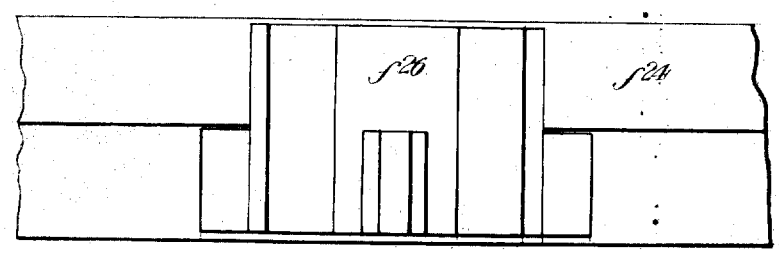
Fig. 8.ᵃ

No. 896,975. PATENTED AUG. 25, 1908.
A. T. DAWSON & G. T. BUCKHAM.
RANGE KEEPER.
APPLICATION FILED FEB. 1, 1907.
8 SHEETS—SHEET 7.
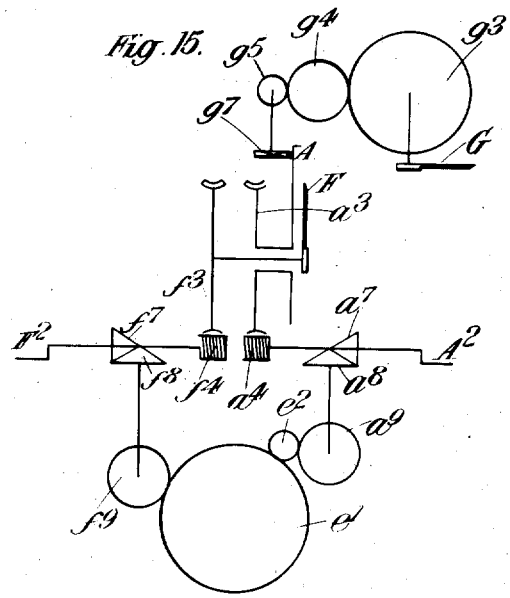
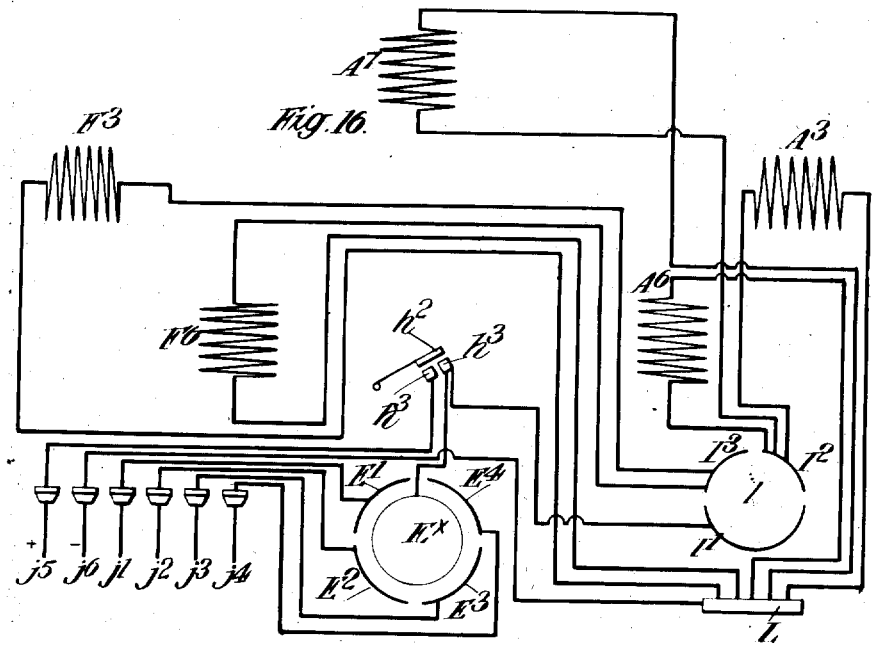
Witnesses:
Inventors:

No. 896,975. PATENTED AUG. 25, 1908.
A. T. DAWSON & G. T. BUCKHAM.
RANGE KEEPER.
APPLICATION FILED FEB. 1, 1907.

8 SHEETS—SHEET 8.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF LONDON, ENGLAND.

RANGE-KEEPER.

No. 896,975.　　　Specification of Letters Patent.　　　Patented Aug. 25, 1908.

Application filed February 1, 1907. Serial No. 355,206.

*To all whom it may concern:*

Be it known that we, ARTHUR TREVOR DAWSON, lieutenant Royal Navy, director and superintendent of ordnance works, and GEORGE THOMAS BUCKHAM, engineer, both subjects of the King of Great Britain, residing at 32 Victoria street, Westminster, in the county of London, England, have invented certain new and useful Improvements in and Relating to Range-Keepers, of which the following is a specification.

This invention relates to range keepers, that is to say apparatus of the kind which is employed for indicating the variations of range or distance between a gun and its target in cases where either or both are subject to changes of position affecting such range or distance, the object being to automatically indicate to those in charge of a gun or guns in ships or other naval structures, the necessary information relating to variations in the range due to the relative movements between such ships or structures, and thus enable such varying ranges to be transmitted from the range-keeper to the various guns' crews. Apparatus of this kind has already been proposed by us and, stated generally, comprised a graduated dial and a pointer actuated by clockwork which imparted to said pointer a movement that was constant at any particular speed to which the apparatus was set, so that by observing the relative speed or change of position between the gun and the target, the operator could set the apparatus to work in correspondence with that speed, whereby the varying range due to the change in the distance between the gun and the target, would continue to be automatically indicated by the apparatus operating as a range keeper. The dial was also adapted to be angularly displaced for initially setting the apparatus or for making large variations in the indicated range. With this apparatus we also employed electrical apparatus, which was independent of the range keeper, for enabling an attendant to transmit from the sending station (*i. e.* the place where the apparatus is located) to suitable receiving apparatus situated adjacent to the gun or guns, the necessary information respecting the range obtained from the aforesaid range keeper. The electrical transmitting and receiving apparatus employed was of the kind in which a rotary transmitting hand-switch caused electric motors of the step-by-step type, forming part of the transmitting and receiving apparatus, to operate in unison and actuate counting devices which were geared with the armatures of the various motors, the armature of each motor being so connected electrically with the aforesaid hand switch that its polarity was changed at each angular movement of the switch, thus causing the armature to perform a partial rotation in its magnetic field at each of such movements, and to turn its counting device one step through the gearing connecting the latter with the armature. By performing a succession of these angular movements the armature and the counting device would be caused to revolve any desired number of revolutions until the required indication appeared in an opening of the transmitter casing. The armature was provided with two pairs of poles and two independent windings, one for each pair of poles, these windings being connected with a hand switch comprising a series of fixed segmental contacts over which a rotary contact piece could be revolved by means of a handle on the exterior of the transmitter, so that at each quarter turn of the handle during its revolutions the current would be directed from one to the other of said armature windings and reverse the polarity of the armature poles. The receivers were similar in construction to the transmitters excepting that they were of course unprovided with the aforesaid hand switch. By this arrangement the changes in range indicated by the range-keeper were read off by an attendant who then transmitted such changes by means of the said hand switch to the various motor-counting devices situated adjacent to the different guns.

According to our present invention instead of employing an independent range keeper and independent transmitting and receiving apparatus controlled by a rotary hand-switch by a separate attendant as aforesaid, we combine the said switch with the said range keeper in such a manner that the variations in the range indicated by the range keeper can be electrically transmitted directly to the various motor-counting devices constituting the receiving apparatus. This result is attained by providing means for enabling the movement of the range-keeper pointer, or of the range-keeper dial, to be transmitted to the rotary switch. For this purpose we preferably provide the apparatus with two independent handles which are under the control of separate attendants, the said handles being so constructed that when one is operative the other is inoperative, their operative condition being dependent upon the excitation of electro-magnetic clutches forming part of appropriate mechanism by which the said handles are respectively connected with the dial of the range-keeper and with an additional pointer which we term a "following pointer", because its function is to follow the movements of the range-keeper pointer. The connection between the aforesaid handles and their electro-magnetic clutches is such that the act of grasping the handle of the range-keeper dial or of the following pointer to turn the same, causes an electric circuit to be completed through the electro-magnetic clutches appertaining to the particular handle to be actuated, the circuit through the electro-magnetic clutches appertaining to the other handle remaining open and therefore preventing this handle from actuating the rotary transmitting switch. For enabling the proper clutches to become operative we provide a reversing switch which is capable of being set to the required position according as the movement of the following pointer or of the dial is to be transmitted to the rotary transmitting switch.

In order to assist the operator in setting or correcting the indications of the dial of the range-keeper, which setting or correcting is effected by the movement of the dial by means of the aforesaid handle appertaining thereto, we provide an additional pointer termed a "correction pointer", which is adapted to travel in either direction over a graduated dial in accordance with the movement imparted to the dial of the range-keeper by the said handle.

In order that our said invention may be clearly understood and readily carried into effect we will describe the same more fully with reference to the accompanying drawings in which:—

Figure 18:
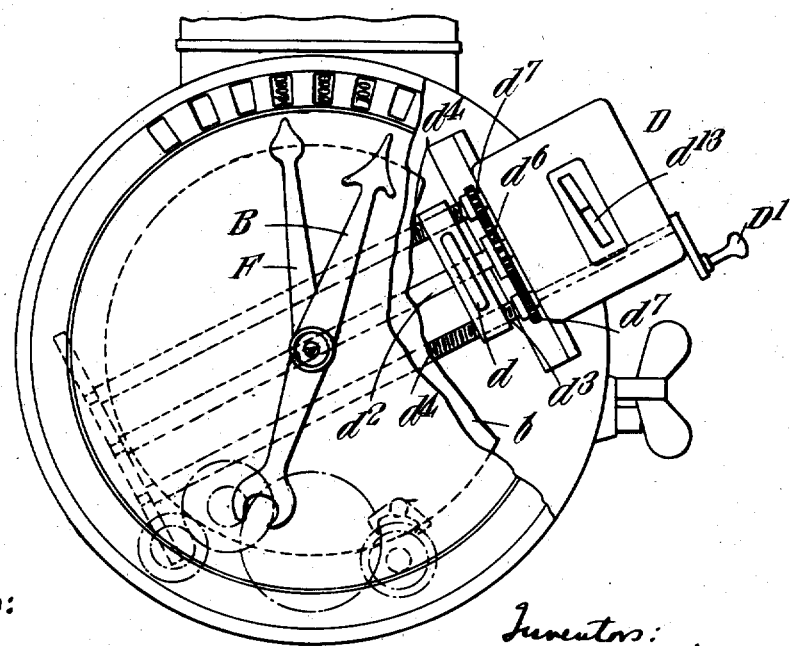

Figure 1 is a plan, and Fig. 2 is a front elevation of the improved apparatus comprising the combined range-keeper and transmitter. Fig. 3 is a cross-section taken approximately on the line 1—1 of Fig. 1, the portion inclosing the clock-movement for actuating the range-keeper pointer being shown in elevation. Fig. 4 is a section taken approximately on the line 2—2 of Fig. 3. Fig. 5 is a front elevation similar to Fig. 2, but with the cover plates removed to exhibit the interior. Fig. 6 is a plan of a portion of the range-keeper dial showing certain gearing connected therewith as hereinafter described, a part of the dial being broken away to enable the said gearing to be more clearly seen. Fig. 7 is a fragmentary sectional view of the central portion of the range-keeper dial and parts connected therewith drawn on an enlarged scale so as to illustrate these parts more clearly than in Fig. 3. Figs. 8 and 8$^a$ are fragmentary views illustrating respectively in elevation and plan a portion of the gearing shown by Fig. 6 more clearly than can be seen in that figure. Fig. 9 is also a fragmentary section illustrating on an enlarged scale a part of the gearing shown in Fig. 4 for actuating the range-keeper dial. Fig. 10 is an elevation of a switch which is moved into its closed position when either of the actuating handles of the apparatus is grasped and which for sake of distinction we term the "primary" switch. Fig. 11 is a cross-section taken approximately on the line 3—3 of Fig. 2 showing the reversing switch which we term the "secondary" switch. Fig. 12 is an elevation of the terminal board or plate carrying the cable leading to the receiving instruments said board or plate being shown detached and reversed to exhibit the inner side thereof. Fig. 13 is a cross-section taken approximately on the line 4—4 of Fig. 2. Fig. 14 is an end view of a bearing for one of the electro-magnetic clutches. Fig. 15 is a diagrammatic view illustrating in a simplified manner the gearing employed in the apparatus. Fig. 16 is a diagrammatic view showing the electrical connections and circuits of the apparatus. Fig. 17 is a sectional elevation and Fig. 18 is a sectional plan of variable speed mechanism, and mechanism for indicating the speed of the range keeper pointer.

A is the graduated dial of the range-keeper.

B is the traveling range-keeper pointer that receives a motion which will be constant at any particular speed to which the instrument is set by the operator. Motion of the range keeper pointer is derived initially from a clock-movement which is inclosed in the part $C^x$ of the casing C of the apparatus and which drives a wheel $b$ (Figs. 3 and 17) through the intervention of the friction roller $d$ and disk $d'$, said wheel being mounted on the axle $b'$ carrying the said pointer B. The clock-movement can be rewound at the proper times by the butterfly head $c$ (Fig. 4) such times being visibly indicated by a telltale $c'$ which is caused to project from the casing of the apparatus by means of a pivoted arm $c^2$ connected with the rewinding mechanism of the clock-movement.

D is the casing inclosing the mechanism for setting the speed at which the traveling pointer B will move under the influence of the clock-movement, and D' is the handle for operating said speed setting mechanism.

The friction roller $d$ of the speed mechanism is rotatably mounted on a spindle $d^2$ and is carried in a carriage $d^3$ mounted on two screwed spindles $d^4$. The spindles $d^2$ $d^4$ are rotatably supported at their ends in frames or side plates $d^5$, and the spindle $d^2$ is provided with a toothed wheel $d^6$ which gears with toothed wheels $d^7$ of equal diameters on the screwed spindles $d^4$. One of the spindles extends through the casing D and is connected to the handle D', movement of which imparts a rotary movement to the spindles $d^4$ in the same direction and causes the friction roller $d$ to be traversed towards or away from the center of the wheel $b$ and to either side thereof for varying the speed of movement of the pointer B in either direction to accord with the rate of increase or diminution in the range. The spindle $d^4$ that extends through the casing D has a toothed pinion $d^8$ gearing with internal teeth $d^9$ formed on a drum $d^{10}$ supported on a fixed cylindrical piece $d^{11}$ extending within the casing D. Interposed between the casing D and the drum $d^{10}$ is a graduated drum $d^{12}$, the graduations of which are visible through an oblique opening $d^{13}$ in the casing D. The graduations are arranged spirally on the drum, which latter, in addition to rotating, also receives a traversing movement, thus enabling large and plain readings to be used thereon. The traversing movement is effected by a pin $d^{14}$ projecting internally from the graduated drum $d^{12}$ through a slot $d^{15}$ in the drum $d^{10}$ and into a spiral groove $d^{16}$ in the fixed cylindrical piece $d^{11}$. The graduations on the drum $d^{12}$ correspond with the speed at which the range or distance between the gun and target increases or diminishes, and are preferably arranged to indicate the speed in knots.

The above described mechanisms are shown somewhat diagrammatic in Figs. 17 and 18, and form no part of the present invention, but are referred to for explanatory purposes only.

E is the rotary member of the transmitting switch which controls the circuits leading to the various receiving instruments that are situated adjacent to the guns for indicating the range.

G is the correction pointer which travels over the graduated dial G' that is situated in a position to be readily observed by the operators who work the apparatus.

H is the primary switch and I is the reversing or secondary switch.

A' F' are two parallel spindles which are adapted to be independently actuated by handles $A^2$ $F^2$ and which are connected respectively with the range dial A and the following pointer F. The dial A comprises a disk or frame whose boss $a$ is countersunk and frictionally attached to a flange $a'$ forming part of a sleeve $a^2$ which is furnished with a worm wheel $a^3$. The following pointer F is mounted on the outer end of a sleeve $f^2$ which surrounds the spindle $b'$ carrying the range pointer B and is supported in a bearing formed in the spider-frame or plate $f'$ carried by the casing of the apparatus. The inner end of the said sleeve $f^2$ is furnished with a worm wheel $f^3$ which is similar to the said worm wheel $a^3$. Gearing with the worm wheel $a^3$ is a worm $a^4$ carried by a sleeve $a^5$ through which extends the spindle A'; said spindle being made hollow for the reception of a sliding rod $a^6$ hereinafter referred to. With the worm wheel $f^3$ gears a worm $f^4$ carried by a sleeve $f^5$ through which extends the spindle F', said spindle (like the spindle A') being made hollow for the reception of a sliding rod $f^6$ also hereinafter referred to. The inner ends of the said hollow spindles A' F' are mounted in bearings $a^s$ $f$ and carry the body portions of the electro magnetic clutches $A^3$ $F^3$ of which the rotary armatures $A^4$ $F^4$ are respectively connected with the said sleeves $a^5$ $f^5$ so as to revolve therewith. These armatures are formed or provided with bevel pinions $a^7$ $f^7$ which gear with bevel wheels $a^8$ $f^8$ of the armatures $A^5$ $F^5$ of other electro-magnetic clutches $A^6$ $F^6$ whose body portions are provided with toothed pinions $a^9$ $f^9$ for operating the said transmitting switch. The rotary member E of this switch is mounted on a spindle $e$ that also carries a toothed wheel $e'$ which engages directly with the pinion $f^9$ and indirectly with the pinion $a^9$ through the intervention of an intermediate pinion $e^2$ (Fig. 15) so that the said spindle $e$ and the switch member E will revolve in the same direction irrespective of which of the pinions $a^9$ $f^9$ is for the time being in action. Thus when the electro-magnetic clutches appertaining to the spindle F' are in action, the movement of the following pointer handle $F^2$ causes the following pointer F and the rotary member E of the transmitting switch to be actuated simultaneously, and when the electro-magnetic clutches appertaining to the spindle A' are in action, the movement of the dial handle $A^2$ causes the dial A and the said rotary member of the transmitting switch to be actuated simultaneously. These clutches are so arranged in the electric circuits including the rotary transmitting switch, that by setting the reversing or secondary switch I into one or other of its extreme positions, the movement of the primary switch H (which is controlled by mechanism actuated from the aforesaid handles) will cause the excitation of the following pointer clutches or of the dial clutches to take place in the act of grasping the respective handles, the arrangement of the secondary switch I being so devised that both sets of clutches cannot be excited at the same time.

The mechanism for operating the primary switch consists, in the example shown, of levers $a^{10}$ $f^{10}$ respectively pivoted at $a^{11}$ $f^{11}$ to bracket pieces on the aforesaid handles $A^2$ $F^2$ and adapted to be moved when the handles are grasped. Heels $a^{12}$ $f^{12}$ on these levers $a^{10} f^{10}$ engage with sliding sleeves $a^{13} f^{13}$ having flanges against which the outer or free ends of intermediate levers $a^{14} f^{14}$ bear. These intermediate levers are hinged at $a^{15} f^{15}$ to the crank portions of the said handles and engage at their inner ends with the aforesaid sliding rods $a^6 f^6$, which extend through the hollow spindles A' F' that are actuated by the said handles $A^2 F^2$. The inner ends of these sliding rods project beyond the inner ends of the hollow spindles A' F' and their bearings $a^x f^x$ and are connected with cross-heads $a^{16} f^{16}$, springs $a^{17} f^{17}$ being interposed between said cross-heads and the bearings $a^x f^x$ and normally tending to keep the parts in their inactive position (Fig. 4). The said cross-heads $a^{16} f^{16}$ are coupled by links $a^{18} f^{18}$ to the opposite ends of an arm $h$ which is pivoted at $h'$ to the spider frame $f'$ of the apparatus and which carries the movable portion $h^2$ of the said primary switch H. When therefore the reversing switch I is moved into the position to enable the circuit to be closed through the clutches $F^3 F^6$, the act of gripping the lever $f^{10}$ and the following pointer handle $F^2$ causes the spring controlled rod $f^6$ to move the movable portion $h^2$ of the primary switch H into contact with the fixed portions $h^3$ of said switch so as to electrically connect these fixed contacts and permit current to flow to the rotary member E of the transmitting switch and also to the said clutches, through the reversing or secondary switch I, so that the actuation of this handle $F^2$ will work the following pointer F and the rotary member E of the transmitting switch. Current will not however at this time be passing to the electro-magnetic clutches $A^3 A^6$ appertaining to the dial handle $A^2$, because the position of the reversing switch I will not allow of it, therefore even if this handle were to be turned it would not impart motion to its clutch, the rotary transmitting switch or the dial. On releasing the lever $f^{10}$ and the handle $F^2$, the spring $f^{17}$ returns the parts to the normal position and causes the contact of the primary switch H to be broken thus cutting off the current from the rotary transmitting switch and from the electro-magnetic clutches $F^3 F^6$. As the primary switch H remains open so long as the apparatus is not being operated it will be obvious that there can be no current passing through the windings of the armatures of the various motors used for actuating the receiving instruments, and that therefore there is no liability of over-heating during such time. It will also be obvious that the following pointer F, or the dial A, and, consequently, the rotary transmitting switch cannot be moved, without current passing through the rotary transmitting switch, and the motors of the receiving instruments and that therefore any movement of the said following pointer F or said dial A must be correspondingly indicated at the receiving instruments.

The correction pointer G is carried by a spindle $g$ upon which is loosely mounted the body portion $A^7$ of an electro-magnetic clutch which is similar to those above referred to and is arranged in circuit with the dial-clutches $A^3 A^6$. The rotary armature $g'$ of this clutch $A^7$ is affixed to the said spindle $g$ and revolves therewith against the resistance of a spring $g^2$ which normally tends to keep the pointer G in the zero position (Fig. 2) and operates to return it to this position when current ceases to flow through the windings of this and the other electro-magnetic clutches in circuit therewith. The said body portion $A^7$ of this clutch is furnished with a toothed wheel $g^3$ which is geared by an intermediate toothed wheel $g^4$ with a pinion $g^5$. This pinion is carried at one end of a spindle $g^6$ having at its opposite end a bevel pinion $g^7$ that gears with a ring of bevel teeth $a^0$ on the back of the dial A. When the said correction-pointer clutch A and the clutches $A^3 A^6$ are electrically excited, the rotation of the dial-handle $A^2$ moves the dial A and the correction pointer G simultaneously. When the said dial-handle $A^2$ is liberated by the attendant, the current is cut off from these clutches by the opening of the switch H, and the correction pointer G returns to its zero position under the influence of the aforesaid controlling spring $g^2$. The aforesaid electro-magnetic clutches comprise, in the example shown, a cylindrical body portion and a rotary disk or armature as aforesaid. All of the said clutches being similar in construction we need only describe one of them, viz: the clutch $A^3$. The body portion is formed with a concentric cavity to receive the windings or bobbin of wire $a^{19}$ for the exciting current and has at the end remote from the armature two collector rings $a^{20}$, to which the ends of the bobbin of wire are respectively connected. The current is supplied to the collector rings by brushes $a^{21}$ carried by two hinged arms $a^{22}$ which are pressed towards the collector rings by a spring $a^{23}$. When the current passes along the windings $a^{19}$, the body of the clutch becomes magnetized and grips the rotary armature, whereby the body and armature will revolve together when the handle $A^2$ is turned. When the current ceases the clutch body loses its magnetic condition and if revolved will move without the armature and therefore will be unable to effect the driving.

The electric circuits of the apparatus are illustrated diagrammatically by Fig. 16. The rotary transmitter switch has a central contact ring $E^x$ and a series of four segmental contacts $E^1 E^2 E^3 E^4$ concentrically arranged with respect to the ring $E^x$ and communicating electrically through contacts $j^1 j^2 j^3 j^4$ at the bottom of the terminal box J with the motor-receivers hereinbefore referred to. One of the fixed contacts $h^3$ of the primary switch H is connected electrically with the ring $E^\times$ and with one (viz. I′) of the contact segments of the secondary switch I of which there are three viz:—$I^1$ $I^2$ $I^3$. The other of the fixed contacts $h^3$ of the primary switch H is electrically connected with the contact $j^5$ of the terminal box J. The remaining contact $j^6$ of the terminal box J is electrically connected with the terminal board L. With this terminal board L is connected one end of each of the windings of the various electro-magnetic clutches $A^3$ $A^6$ $A^7$, $F^3$ $F^6$. The other ends of these windings are connected with the segmental contacts $I^2$ $I^3$ of the secondary switch I, i. e. the windings $A^3$ $A^6$ $A^7$ are connected with the segmental contact $I^2$ and the windings $F^3$ $F^6$ with the segmental contact $I^3$. It will therefore be seen that when the contact arm $i$ of the secondary switch I is moved into a position towards the left to connect the segments $I^1$ $I^3$, the closing of the primary switch H by grasping the following pointer handle $F^2$ will close the circuit through the windings of the electro-magnetic clutches $F^3$ $F^6$ and thus excite said clutches whereby the rotation of the said following pointer handle will cause the rotary member E of the transmitting switch to be revolved in accordance with the movement of the following pointer and will thereby operate the motor-receivers accordingly. If on the other hand the contact arm $i$ of the secondary switch I be moved to the right so as to electrically connect the segments $I^1$ $I^2$, the circuit including the windings of the electro-magnetic clutches $F^3$ $F^6$ will be broken and the circuit including the clutches $A^3$ $A^6$ $A^7$ will be completed by the closing of the primary switch H when the dial handle $A^2$ is grasped, so that the electro-magnetic clutches $A^3$ $A^6$ $A^7$ will become excited. Upon turning this dial-handle, the dial will be actuated to an extent which will be indicated by the correction pointer G, and at the same time the rotary member E of the transmitting switch will be actuated to a corresponding extent and operate the motor-receivers accordingly, thus causing the indications exhibited by the counting devices of the said receivers to be increased or diminished so as to add to or subtract from the range indications that have been previously transmitted to said receivers and their counting devices by the movements of the following pointer F.

We prefer to affix to the dial A a perforated screen or ring $A^\times$ through the perforations of which the range figures are visible. These figures are engraved upon a displaceable peripheral ring $A^0$ carried by the said range dial and are arranged in several series representing different ranges, any one of which series can be exposed through the perforations by angularly displacing the peripheral ring with respect to the dial and its perforated screen. In order to avoid the liability of the attendant failing to shift the said peripheral ring when the range indicated by one series is to be transferred to another series, we provide for the said shifting to be effected automatically by the movement of the following pointer F. This is accomplished in the example shown by providing the hollow spindle or sleeve $f^2$ of the said following pointer with a disk $f^{24}$ having at an appropriate part of its periphery, two teeth $f^{25}$ (Figs. 6 and 7) and one space, the remainder of the periphery being of two diameters, one corresponding with the top of the teeth and the other with the bottom thereof. Working in conjunction with this disk $f^{24}$ is a toothed pinion $f^{26}$ which at the proper times imparts motion to the aforesaid graduated peripheral ring $A^0$ through the intervention of an intermediate toothed wheel or sector $f^{27}$ engaging with teeth on said peripheral ring. The said pinion $f^{26}$ has alternately broad and narrow teeth so that two of the broad teeth will lie upon the larger diameter of the disk $f^{24}$ and a narrow tooth on the smaller diameter, the broad teeth acting as stops to prevent the toothed wheel or sector $f^{27}$ and the graduated peripheral ring $A^0$ from shifting relatively to the openings in the perforated screen $A^\times$, except at such times when the following pointer F reaches the limit of the indications of a particular series of range figures. The continued movement of the following pointer F in the same direction, then brings the two teeth of the said disk $f^{24}$ into engagement with the pinion $f^{26}$ thus actuating the latter and causing it to move the intermediate toothed wheel or sector $f^{27}$ sufficiently to displace the graduated peripheral ring $A^0$ the requisite distance for exposing the next ensuing series of figures through the openings of the perforated screen $A^\times$.

For the purpose of enabling all the counting devices of the motor-receivers to be returned to zero for correcting errors that may arise in the readings indicated by said counting devices, we have shown the dial A driven by means of frictional contact; that is to say it is held upon its hollow spindle or sleeve $a^2$ by a spring washer $a^{24}$ (Fig. 7) contained within the countersunk boss $a$ and interposed between said boss and a screw nut $a^{25}$, by the adjustment of which the said washer can be caused to press the boss against the flange $a^1$ of the sleeve $a^2$ with the requisite amount of force to obtain the necessary degree of frictional driving contact between said dial and sleeve, the said nut being retained in its adjusted position by means of a set screw $a^{26}$. The hollow spindle or sleeve $f^2$ of the following pointer is furnished with a toothed pinion $f^{28}$ gearing with a toothed wheel $f^{29}$ mounted on an axis pin $f^{30}$ carried by the dial A. This toothed wheel $f^{29}$ has a peripheral projection or stop $f^{31}$ which when the dial reaches the zero position will come against the toothed pinion $f^{28}$ as shown at Fig. 6, thus preventing further relative motion in that direction between the dial and the following pointer. On any further motion being given to either of the handles $A^2$ $F^2$, the pressure will overcome the friction of the spring washer and the dial will slip relatively to the sleeve $f^2$, so that the rotary member E of the transmitting switch will then revolve without movement being imparted to the said dial or the following pointer. By this means the rotary transmitting switch can be actuated through the gearing $a^9$ $e^2$ $e^1$ or through the gearing $f^9$ $e^1$ according as the handle $A^2$ or $F^2$ is in operation, for bringing all the counting devices of the motor receivers to zero, while the dial itself and the following pointer remain at zero. Or instead of the above described arrangement, the spindle $e$ of the rotary member E of the transmitting switch may be adapted to be revolved by hand, for which purpose it is formed to receive a handle inserted through an opening in the casing of the apparatus which opening can be exposed by turning to one side a hinged shutter $c^8$. In this case prior to moving the said rotary member of the transmitting switch the secondary or reversing switch I would be turned into its intermediate or "cut out" position shown in Fig. 2 so as to electrically disconnect all the electro-magnetic clutches from the circuit. When the rotary member of the transmitting switch is actuated by the said handle, its spindle will revolve without meeting with undue impediment from the toothed gearing $e^1$ $a^9$ $f^9$ owing to the fact that the pinions $a^9$ $f^9$ are able to turn freely with the body portions of the electro-magnetic clutches $A^6$ $F^6$ which cannot be excited by the current, owing to their being cut out of circuit by the position occupied by the secondary or reversing switch I.

The contacts $m^1$ $m^2$ $m^3$ $m^4$ $m^5$ $m^6$ to which the cable of wires $M^1$ constituting the leads for the various motor-receivers, are connected on the inner side of a detachable terminal board or plate M, said contacts being of a resilient character so that when the said terminal board is placed in position to cover the terminal box J, these contacts will bear against the aforesaid corresponding contacts $j^1$ $j^2$ $j^3$ $j^4$ $j^5$ $j^6$ that are situated within said terminal box and thus effect a satisfactory electrical connection therewith. By arranging the said contacts in two sets one of which is situated in the terminal box J and the other on the detachable terminal board M, a ready means is provided for inspecting them without the necessity of detaching their connecting wires.

The working of the apparatus is as follows:—Let it be assumed that the initial range between the gun and its target is 800 yards; the dial A would then be set into a position in which the figure 800 would appear in the uppermost perforation of the screen $A^\times$. This would be effected by first shifting the arm $i$ of the secondary or reversing switch I towards the right so that it electrically connects the contact segments $I^1$ and $I^2$ (Fig. 16) whereby the circuit through the electro-magnetic clutches $A^3 \cdot A^6$ $A^7$ would be closed through said switch. Then the dial handle $A^2$ and its lever $a^{10}$ would be grasped, with the result that the movable contact $h^2$ of the primary switch H would close the contacts $h^3$ thereof by the movement of the sliding rod $a^6$. The said electro-magnetic clutches $A^3$ $A^6$ $A^7$ would then be excited by the current so that upon turning the said dial handle $A^2$ in the proper direction, the rotary armature $a^7$ would revolve the worm $a^4$ and cause the dial A to be rotated, until the figure 800 appearing at one of the aforesaid perforations of the screen $A^\times$ came opposite to the follower pointer. At the same time the correction pointer G would be actuated by the movement of the dial through the gearing $a^9$ $g^7$ $g^5$ $g^4$ $g^3$ and the electro-magnetic clutch $A^7$, until the said pointer reached the figure 800 of its dial. Simultaneously with these movements of the dial A and the correction pointer G, the rotary member E of the transmitting switch would be actuated through the bevel wheels $a^7$ $a^8$, the electro-magnetic clutch $A^6$ and the gear wheels $a^9$ $e^2$ $e^1$, and cause the various motor-receivers to move their counting devices until the figure 800 was indicated by them. This having been effected the 800 yards range would have been transmitted to all the guns, whose receivers are in circuit with the range keeper, so that the guns' crews would know at what range to set their sights. The secondary switch I would now be moved towards the left, to electrically connect the contact segments $I^1$ and $I^3$, whereby the circuit through the aforesaid electro-magnetic clutches $A^3$ $A^6$ $A^7$ would be broken. The spring $g^2$ would then return the correction pointer G to zero owing to the fact that the electro-magnetic clutch $A^7$ would cease to be excited and exert no longer any magnetic hold upon the rotary armature with which said spring is connected. The aforesaid movement of the secondary switch I would also cause the circuit to be closed through the electro-magnetic clutches $F^3$ $F^6$ when the following pointer handle $F^2$ and its lever $f^8$ were grasped and the sliding rod $f^6$ shifted to cause the primary switch H to be closed. These electro-magnetic clutches would then be excited.

By observing the relative speed or change of position between the target and the gun, the operator can ascertain what change of speed or direction of the range keeper or pointer is necessary to keep the same in correspondence with the alterations in the range or distance of the gun from the target. If the range between the gun and its target is increasing, the range-keeper pointer B will be moving around the dial A in a direction from left to right, at a speed depending upon that at which the range is increasing, this speed being controlled by the handle $D^1$ as hereinbefore described. Then the handle $F^2$ would be turned in a direction to cause the pointer F to catch up to and to move in coincidence with the pointer B, this movement being transmitted to the pointer F through the worm gearing $f^4 f^3$. At the same time the rotary member E of the transmitting switch would be caused to move to a corresponding extent through the bevel wheels $f^7 f^8$ the clutch $f^6$ and the gearing $f^9 e^1$. The various motor-receivers would thus be further actuated to the necessary extent to cause their counting devices to add to their indicated range, the necessary amount to agree with that indicated on the dial A by the pointer B and the following pointer F.

If it becomes necessary to add to or subtract from the indicated range an amount greater or less than the increments due to the movement of the pointers B and F, the secondary switch I is moved towards the right, in order to throw out of circuit the electro-magnetic clutches $F^3 F^6$ and bring into circuit the electro-magnetic clutches $A^3 A^6 A^7$ as aforesaid. The dial handle $A^2$ would then be turned to move the dial until the correction pointer G indicated on its dial the requisite number of yards required to be added to or subtracted from the range indicated on the dial A, the said handle being of course turned in one direction for adding to and in the opposite direction for subtracting from the indicated range. It will be readily understood from what has already been stated above, that during this movement of the range dial the rotary transmitting switch also moves and thus causes the various motor-receivers to change the indications of their counting devices in accordance with the change effected in the indication on the dial A. As soon as the said dial handle is released the spring $g^2$ returns the correction pointer to its zero position as aforesaid. The secondary switch I is then turned towards the left to again bring the electro-magnetic clutches $F^3 F^6$ into circuit and then by actuating the following pointer handle $F^2$, the following pointer F can be caused to continue to follow the pointer B as before and impart motion to the rotary transmitting switch for causing the various motor-receivers to be actuated and keep the indications of their counting devices in synchronism with the indications of the traveling pointer B.

What we claim and desire to secure by Letters Patent of the United States is:—

1. In electric signaling apparatus for guns, the combination of a range-keeper situated at the sending station, a transmitting switch operatively connected with the range-keeper and adapted to be electrically connected with the various range indicating instruments situated contiguous to the guns, and means for imparting motion to said transmitting switch in accordance with the variations in the range indicated by the range-keeper.

2. In electric signaling apparatus for guns, the combination of a range-keeper situated at the sending station, a rotary transmitting switch adapted to be electrically connected with the various range indicating instruments situated contiguous to the guns, a range keeper dial means for angularly displacing such dial a range-keeper pointer, a following pointer adapted to follow the movements of the range-keeper pointer, means for actuating said following pointer, and means for imparting motion to said rotary transmitting switch simultaneously with the movement imparted to the dial or the following pointer of the range-keeper.

3. In electric signaling apparatus for guns, the combination of a range-keeper situated at the sending station, a rotary transmitting switch adapted to be electrically connected with the various range indicating instruments situated contiguous to the guns, a range keeper dial means for angularly displacing such dial a range-keeper pointer, a following pointer adapted to follow the movements of the range-keeper pointer, means for actuating said following pointer, normally inoperative electro-magnetic clutches forming part of the aforesaid means for imparting motion to the said dial or the said following pointer, means whereby either the said electro-magnetic clutches appertaining to the dial-actuating mechanism or the electro-magnetic clutches appertaining to the following pointer mechanism are rendered operative, and means whereby the said electro-magnetic clutches when thus rendered operative will impart motion to the said rotary transmitting switch simultaneously with the movement imparted to the dial or the following pointer of the range-keeper.

4. In electric signaling apparatus for guns, the combination of a range-keeper situated at the sending station, a rotary transmitting switch adapted to be electrically connected with the various range indicating instruments situated contiguous to the guns, a range keeper dial means for angularly displacing such dial a range-keeper pointer, a following pointer adapted to follow the movements of the range-keeper pointer, means for actuating said following pointer, normally inoperative electro-magnetic clutches forming part of the aforesaid means for imparting motion to the said dial or the said following pointer, independent electric circuits leading from a source of electric supply and including the electro-magnetic clutches and the rotary transmitting switch, and a hand switch for bringing one or other of said circuits into operative relationship with its electro-magnetic clutches and the rotary transmitting switch.

5. In electric signaling apparatus for guns, the combination of a range-keeper situated at the sending station, a rotary transmitting switch adapted to be electrically connected with the various range indicating instruments situated contiguous to the guns, a range keeper dial, gearing for angularly displacing such dial a range-keeper pointer, a following pointer adapted to follow the movements of the range-keeper pointer, gearing for actuating said following pointer, normally inoperative electro-magnetic clutches forming part of the aforesaid gearing for imparting motion to the said dial or the said following pointer, means whereby either the said electro-magnetic clutches appertaining to the dial actuating gearing or the electro-magnetic clutches appertaining to the following pointer gearing are rendered operative, independent crank handles for driving either of said gearings through the intervention of the said electro-magnetic clutches and means whereby the driving of said gearing will simultaneously impart motion to the said rotary transmitting switch.

6. In electric signaling apparatus for guns, the combination of a range-keeper situated at the sending station, a rotary transmitting switch adapted to be electrically connected with the various range indicating instruments situated contiguous to the guns, a range keeper dial means for angularly displacing such dial a range-keeper pointer, a correction pointer movable simultaneously with the range-keeper dial, a following pointer adapted to follow the movements of the range-keeper pointer, means for actuating said following pointer, and means for imparting motion to said rotary transmitting switch simultaneously with the movement imparted to the dial and the correction pointer or to the following pointer.

7. In a combined range-keeper and rotary transmitting switch, a range keeper dial and following pointer, independent worm wheels for actuating the said dial and pointer, independent electro-magnetic clutches, sleeves carrying the rotary members or armatures thereof and having worms gearing with the said worm wheels, hollow shafts carrying the body portions of said independent electro-magnetic clutches and extending through said sleeves, means for independently revolving said hollow shafts by hand, a primary switch for closing the circuits through either of said independent electro-magnetic clutches, means for actuating said primary switch when either of the means for independently revolving the hollow shafts is operated, means operatively connecting said independent electro-magnetic clutches with the rotary transmitting switch, and a secondary switch operating to place one or other of said independent electro-magnetic clutches into the circuit including said primary switch.

8. In a combined range-keeper and rotary transmitting switch, a range keeper dial and following pointer, independent worm wheels for actuating the said dial and pointer, independent electro-magnetic clutches, sleeves carrying the rotary members or armatures thereof and having worms gearing with said worm wheels, hollow shafts carrying the body portions of said independent electro-magnetic clutches and extending through said sleeves, crank handles for independently revolving said hollow shafts, a primary switch for closing the circuits through either of said independent electro-magnetic clutches, sliding rods extending through said hollow shafts and engaging at their inner ends with the said primary switch, lever mechanism carried by said crank handles for actuating the sliding rods and closing the primary switch in the act of grasping the crank handles, means operatively connecting said independent electro-magnetic clutches with the rotary transmitting switch, and a secondary switch operating to place one or other of said independent electro-magnetic clutches into the circuit including said primary switch.

9. In a combined range-keeper and rotary transmitting switch, a range keeper dial and following pointer, independent worm wheels for actuating the said dial and pointer, independent electro-magnetic clutches, sleeves carrying the rotary members or armatures thereof and having worms gearing with said worm wheels, hollow shafts carrying the body portions of said independent electro-magnetic clutches and extending through said sleeves, means for independently revolving said hollow shafts by hand, gear wheels mounted on said rotary members or armatures of the independent electro-magnetic clutches, other electro-magnetic clutches having rotary members or armatures gear wheels mounted thereon and gearing with the aforesaid gear wheels, spindles which fixedly carry the rotary members or armatures of the last mentioned electro-magnetic clutches and which loosely carry their body portions, gear wheels connecting said body portions of the last mentioned electro-magnetic clutches to the aforesaid rotary transmitting switch, a primary switch for closing the circuits through said electro-magnetic clutches, means for operating said primary switch when either of the means for independently revolving the hollow shafts is operated, and a secondary switch operating to place one or other pair of said geared clutches into the circuit including said primary switch.

10. In a combined range-keeper and rotary transmitting switch, the combination with an angularly displaceable range-keeper dial, of an electro-magnetic clutch having a body portion and a rotary member or armature gearing connecting said dial to the body portion of the said clutch, a pair of geared electro-magnetic clutches appertaining to the dial actuating mechanism arranged in circuit with the aforesaid clutch, a spindle loosely carrying said body portion and fixedly carrying the rotary member or armature of said electro-magnetic clutch, and a pointer mounted on said spindle and adapted to travel over a graduated dial against the resistance of spring pressure.

11. In a combined range-keeper and rotary transmitting switch, the combination with an angularly displaceable range-keeper dial, of an annular perforated screen movable with said dial, a peripheral ring bearing several series of range graduations for exposure through the said perforated screen, and means for automatically shifting said graduated peripheral ring relatively to the dial when the end of one series of graduations is reached and a succeeding series is to be exposed through the perforated screen.

12. In a combined range-keeper and rotary transmitting switch, the combination with an angularly displaceable range-keeper dial, of an annular perforated screen movable with said dial, a peripheral ring bearing several series of range graduations for exposure through the said perforated screen, a toothed wheel or segment pivotally mounted on the said dial and gearing with teeth on the said peripheral ring, a toothed pinion having alternately broad and narrow teeth and pivotally mounted on the said dial and gearing with the aforesaid toothed wheel or segment, and a notched or partially toothed disk with two diameters driven by the movement of a following pointer and operating to actuate said toothed pinion each time the teeth or notches of said disk pass the said toothed pinion but restraining movement of said toothed pinion at other times by the broad teeth engaging with the larger diameter.

13. In a combined range-keeper and rotary transmitting switch, the combination with an angularly displaceable range-keeper dial and a worm wheel for actuating the same, of means for frictionally connecting said dial with said worm wheel, and means whereby when the range dial reaches the zero position, the dial actuating gear is able to continue to drive the rotary transmitting switch without driving the dial.

14. In a combined range-keeper and rotary transmitting switch, the combination with an angularly displaceable range-keeper dial and a following pointer, of worm gearing for independently driving said dial and said following pointer, a worm wheel forming part of such gearing provided with a flanged sleeve, a boss formed on said dial, a resilient washer mounted on said flanged sleeve and bearing against said boss of the dial to press it against said flanged sleeve, an adjustable collar for regulating the degree of pressure exerted by said resilient washer, a toothed pinion mounted on the sleeve of the worm wheel of the following pointer gearing, a toothed wheel pivoted to the range dial and gearing with said toothed pinion, and a stop on said toothed wheel adapted to bear against the toothed pinion when the dial is at its zero position and thus prevent the further movement of the dial so that the worm gearing of either the dial or the following pointer can then revolve the rotary transmitting switch without the dial or the following pointer.

In testimony whereof we have hereunto set our hands in presence of two subscribing witnesses this seventeenth day of January 1907.

ARTHUR TREVOR DAWSON.
GEORGE THOMAS BUCKHAM.

Witnesses:
HENRY KING,
H. PETER VENN.